(12) United States Patent
Schultz et al.

(10) Patent No.: US 7,740,387 B2
(45) Date of Patent: *Jun. 22, 2010

(54) BACKLIGHT WEDGE WITH SIDE MOUNTED LIGHT SOURCE

(75) Inventors: John C. Schultz, Afton, MN (US); Jacob Moskovich, Cincinnati, OH (US); William J. Bryan, Mahtomedi, MN (US); Michael A. Meis, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/440,344

(22) Filed: May 24, 2006

(65) Prior Publication Data

US 2007/0274094 A1 Nov. 29, 2007

(51) Int. Cl.
*F21V 7/04* (2006.01)
(52) U.S. Cl. ............... 362/606; 362/97.3; 362/330; 362/608; 362/612; 385/129; 385/130; 385/131; 385/132; 385/146
(58) Field of Classification Search ................ 362/600, 362/606–608, 612, 613, 615, 623, 330, 511, 362/560, 561, 601, 609, 624, 97.3, 610, 800; 385/14, 88, 89, 92, 94, 129, 130, 131, 132, 385/146
See application file for complete search history.

(56) References Cited

U.S. PATENT DOCUMENTS

| | | | |
|---|---|---|---|
| 3,923,381 A | 12/1975 | Winston | |
| 4,013,915 A | 3/1977 | Dufft | |
| 4,240,692 A | 12/1980 | Winston | |
| 4,918,583 A | 4/1990 | Kudo et al. | |
| 4,963,933 A | 10/1990 | Brownlee | |
| 5,001,609 A | 3/1991 | Gardner et al. | |
| 5,050,946 A | 9/1991 | Hathaway et al. | |
| 5,055,978 A | 10/1991 | Rogoff | |
| 5,059,013 A | 10/1991 | Jain | |
| 5,202,950 A | 4/1993 | Arego et al. | |
| 5,255,171 A | 10/1993 | Clark | |
| 5,296,601 A | 3/1994 | Suto et al. | |
| 5,359,691 A | 10/1994 | Tai et al. | |
| 5,671,028 A | 9/1997 | Okano | |
| 5,835,661 A | 11/1998 | Tai et al. | |
| 5,854,872 A | 12/1998 | Tai | |
| 5,876,107 A * | 3/1999 | Parker et al. ............... | 362/600 |
| 5,882,774 A | 3/1999 | Jonza et al. | |
| 5,926,601 A | 7/1999 | Tai et al. | |

(Continued)

FOREIGN PATENT DOCUMENTS

EP 760962 10/2002

(Continued)

*Primary Examiner*—Sandra L O'Shea
*Assistant Examiner*—Mary Zettl

(57) ABSTRACT

A backlight may include a light guide and a light input. The light guide may have a light reflection surface and a light emission surface. The light input may include a diverging wedge having a narrow end and opposing side surfaces extending to the narrow end. A light source may be disposed adjacent to one of the opposing side surfaces and may emit light into the light input portion. A multilayer polymeric mirror film may be disposed adjacent to the opposing side surfaces but not in intimate contact therewith and may reflect more than 95% of visible light incident on the multilayer polymeric mirror film.

19 Claims, 3 Drawing Sheets

U.S. PATENT DOCUMENTS

| | | | |
|---|---|---|---|
| 6,080,467 A | 6/2000 | Weber et al. | |
| 6,104,454 A * | 8/2000 | Hiyama et al. | 349/65 |
| 6,905,220 B2 | 6/2005 | Wortman et al. | |
| 6,924,014 B2 | 8/2005 | Ouderkirk et al. | |
| 6,950,220 B2 | 9/2005 | Abramson et al. | |
| 6,975,370 B2 | 12/2005 | Yu et al. | |
| 7,080,932 B2 | 7/2006 | Keuper | |
| 7,178,964 B2 | 2/2007 | Sugiura et al. | |
| 7,262,708 B1 * | 8/2007 | Addicks | 340/815.63 |
| 7,317,182 B2 | 1/2008 | Schultz et al. | |
| 7,497,609 B2 | 3/2009 | Maeda et al. | |
| 2001/0046131 A1 | 11/2001 | Hoelen et al. | |
| 2002/0030772 A1 | 3/2002 | Nauta et al. | |
| 2002/0061178 A1 | 5/2002 | Winston et al. | |
| 2002/0141174 A1 | 10/2002 | Parker | |
| 2002/0191416 A1 * | 12/2002 | Wesson | 362/555 |
| 2003/0076034 A1 | 4/2003 | Marshall et al. | |
| 2003/0165067 A1 | 9/2003 | Imamura et al. | |
| 2003/0189828 A1 * | 10/2003 | Coushaine | 362/226 |
| 2004/0042233 A1 * | 3/2004 | Suzuki et al. | 362/561 |
| 2004/0062028 A1 | 4/2004 | Winston et al. | |
| 2004/0071437 A1 | 4/2004 | Tamura et al. | |
| 2004/0114068 A1 | 6/2004 | Yu et al. | |
| 2004/0161222 A1 | 8/2004 | Niida et al. | |
| 2004/0175552 A1 | 9/2004 | Ouderkirk | |
| 2004/0201990 A1 * | 10/2004 | Meyer | 362/255 |
| 2004/0207775 A1 | 10/2004 | Min et al. | |
| 2005/0007753 A1 | 1/2005 | Van Hees et al. | |
| 2005/0023545 A1 | 2/2005 | Camras et al. | |
| 2005/0146894 A1 | 7/2005 | Keuper | |
| 2005/0207178 A1 * | 9/2005 | Parker | 362/612 |
| 2005/0259939 A1 | 11/2005 | Rinko | |
| 2006/0002141 A1 | 1/2006 | Ouderkirk et al. | |
| 2006/0002678 A1 | 1/2006 | Weber et al. | |
| 2006/0008205 A1 | 1/2006 | Meir et al. | |
| 2006/0104092 A1 | 5/2006 | Feng et al. | |
| 2006/0132423 A1 | 6/2006 | Travis | |
| 2006/0197433 A1 | 9/2006 | Chen | |
| 2006/0209564 A1 * | 9/2006 | Lin et al. | 362/609 |
| 2007/0014126 A1 * | 1/2007 | Kuo et al. | 362/600 |
| 2007/0025680 A1 | 2/2007 | Winston et al. | |
| 2007/0081360 A1 | 4/2007 | Bailey et al. | |
| 2007/0274094 A1 | 11/2007 | Schultz et al. | |
| 2007/0274095 A1 | 11/2007 | Destain | |
| 2007/0279931 A1 | 12/2007 | Bryan et al. | |

FOREIGN PATENT DOCUMENTS

| | | |
|---|---|---|
| JP | 200315413 | 1/2003 |
| JP | 2003-272424 | 9/2003 |
| JP | 2004-022175 | 1/2004 |
| JP | 2004031064 | 1/2004 |
| JP | 2004-158452 | 6/2004 |
| JP | 2004247207 | 9/2004 |
| JP | 2005-135844 | 5/2005 |
| JP | 2006128896 | 5/2006 |
| WO | WO 0184229 | 11/2001 |
| WO | WO 03048635 | 6/2003 |
| WO | WO 03096925 | 11/2003 |

* cited by examiner

BACKLIGHT WEDGE WITH SIDE MOUNTED LIGHT SOURCE

BACKGROUND

The present disclosure relates generally to optical assemblies such as backlights.

Optical devices employing backlights are used, for example, in displays for laptop computers, hand-held calculators, digital watches, cellphones, televisions and similar devices as well as illuminated signs and many other devices.

Light can be supplied to backlights via optical elements that can include conventional reflectors. Conventional reflectors, including pigmented surfaces, silvered mirrors, polished metallic or metallized surfaces, etc., suffer from a number of disadvantages in many applications. For example, these conventional reflectors suffer from relatively high absorbance of light incident on their surfaces, often absorbing about 10% of the light incident on them. As a result, the amount of light remaining after each reflection is less than that initially provided. In devices in which multiple reflections are encountered, the overall output of the optical device can be substantially limited.

SUMMARY

In an illustrative but non-limiting example of the disclosure, a backlight is disclosed. A backlight may include a visible light transmissive body that primarily propagates light by total internal reflection (TIR) and that has an input surface and an output surface. The visible light transmissive body includes a light input portion having non-parallel opposing side surfaces and a light guide portion having a light reflection surface and a light emission surface. A light source may be disposed adjacent to the input surface such that the light source emits light into the input surface. The input surface may be one of the opposing side surfaces. A multilayer polymeric mirror film may be disposed adjacent to the opposing side surfaces but not in intimate contact with the opposing side surfaces and may reflect more than 95% of visible light incident on the multilayer polymeric mirror film.

In another illustrative but non-limiting example of the disclosure, a backlight is disclosed. A backlight may include a diverging wedge that is defined by a narrow end surface and a wide end surface, and opposing non-parallel side surfaces that extend between the narrow end surface and the wide end surface. A light source may be disposed adjacent to one of the opposing side surfaces such that the light source emits light into the diverging wedge. A multilayer polymeric mirror film may be disposed adjacent to but not in intimate contact with the opposing side surfaces and may reflect more than 95% of visible light incident on the multilayer polymeric mirror film.

In another illustrative but non-limiting example of the disclosure, a backlight is disclosed. A backlight may include a first diverging wedge that is defined by a first narrow end surface and a first wide end surface, and first non-parallel opposing side surfaces that extend between the first narrow end surface and the first wide end surface. A first light source may be disposed adjacent to one of the first opposing side surfaces such that the first light source emits light into the first diverging wedge.

The backlight may include a second diverging wedge that is defined by a second narrow end surface and a second wide end surface, and second non-parallel opposing side surfaces that extend between the second narrow end surface and the second wide end surface. A second light source may be disposed adjacent to one of the second opposing side surfaces such that the second light source emits light into the second diverging wedge.

A light guide having a light reflection surface and a light emission surface may be optically coupled to the first wide end surface and to the second wide end surface. A multilayer polymeric mirror film may be disposed adjacent to but not in intimate contact with the first and second opposing side surfaces, and may reflect more than 95% of light incident on the multilayer polymeric mirror film.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE FIGURES

The disclosure may be more completely understood in consideration of the following detailed description of the accompanying drawings, in which.

DETAILED DESCRIPTION

Figure 1:
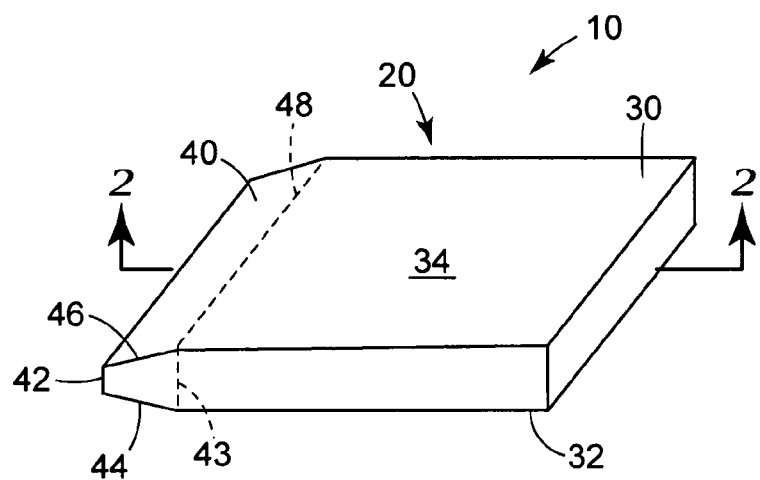
FIG. 1 is a schematic perspective view of an illustrative but non-limiting backlight as described herein.

Accordingly, the present disclosure is directed to backlights having light input wedges with highly specularly reflective layers separated from the light input wedge by an air gap. While the present invention is not so limited, an appreciation of various aspects of the invention will be gained through a discussion of the examples provided below.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend.

A specularly reflective surface is a surface for which an incident light ray is reflected such that the reflected angle is equal to the angle of incidence. On a practical basis, all surfaces have some deformation which results in some scattering of the reflected light ray and for the purposes of this discussion, a value of 10% of the light energy may be reflected at angles not equal to the incident angle. In many embodiments, there is less than 1% of the light reflected at angles not equal to the incident angle.

The present disclosure is applicable to illumination assemblies, and is more particularly applicable to illumination assemblies that provide illumination using light sources. The illumination assemblies disclosed herein can be used for general lighting purposes, e.g., to illuminate an area, or for providing information to a viewer by selective illumination of different areas of the assembly as in an information display. Such assemblies are suitable for use in backlight displays, signs, luminaries, and other lighting applications that require a significant amount of light.

The light sources described herein can include any suitable light source. In some embodiments the light source is a cold cathode fluorescent lamp (CCFL). In many embodiments, the light source includes one or more discrete light emitting diodes (LED) dies or chips with associated electrical substrate and optionally a thermal dissipating mechanism. As used herein, the terms "LED" and "light emitting diode" refer generally to light emitting semiconductor elements with contact areas for providing power to the diode. A III-V semiconductor light emitting diode may be formed, for example, from a combination of one or more Group III elements and one or more Group V elements. Suitable materials include nitrides, such as gallium nitride or indium gallium nitride, and phosphides, such as indium gallium phosphide. Other types of III-V materials can also be used, as can inorganic materials from other groups of the periodic table. In many instances, the LED is a "flip-chip" or "wire bond" LED.

LEDs can be selected to emit at any desired wavelength, such as in the red, green, blue, cyan, magenta, yellow, ultraviolet, or infrared spectral regions. In an array of LEDs, the LEDs can each emit in the same spectral region, or can emit in different spectral regions. Different LEDs may be used to produce different colors where the color of light emitted from the light emitting element is selectable. Individual control of the different LEDs leads to the ability to control the color of the emitted light. In addition, if white light is desired, then a number of LEDs emitting light of different colors may be provided, whose combined effect is to emit light perceived by a viewer to be white.

Another approach to producing white light is to use one or more LEDs that emit light at a relatively short wavelength and to convert the emitted light to white light using a phosphor wavelength converter. White light is light that stimulates the photoreceptors in the human eye to yield an appearance that an ordinary observer would consider "white." Such white light may be biased to the red (commonly referred to as warm white light) or to the blue (commonly referred to as cool white light). Such light can have a color rendering index of up to 100. In one embodiment, a collection of red, blue, and green LED dies can be selectively placed in an array. The resulting emission of light is seen by an observer as colored light or "white" light, when blended together in concert.

In other embodiments, the radiation sources includes organic light emitting diodes (OLED), vertical cavity surface emitting lasers (VCSEL), laser diodes, and the like.

The light source devices described herein utilize the unique and advantageous properties of multilayer optical films. The advantages, characteristics and manufacturing of such films are most completely described in U.S. Pat. No. 5,882,774, which is incorporated herein by reference. The multilayer optical film is useful, for example, as highly efficient spectral mirrors. A relatively brief description of the properties and characteristics of the multilayer optical film is presented below followed by a description of illustrative embodiments of backlight systems using the multilayer optical mirror film according to the present disclosure.

Multilayer optical mirror films as used in conjunction with the present invention exhibit relatively low absorption of incident light, as well as high reflectivity for off-axis as well as normal light rays. The unique properties and advantages of the multi-layer optical film provides an opportunity to design highly efficient backlight systems which exhibit low absorption losses when compared to known backlight systems. Exemplary multilayer optical mirror film of the present invention is described in U.S. Pat. No. 6,924,014, which is incorporated herein by reference (see Example 1 and Example 2). Exemplary multilayer optical mirror film includes a multilayer stack having alternating layers of at least two materials. At least one of the materials has the property of stress induced birefringence, such that the index of refraction (n) of the material is affected by the stretching process. The difference in refractive index at each boundary between layers will cause part of a ray to be reflected. By stretching the multilayer stack over a range of uniaxial to biaxial orientation, a film is created with a range of reflectivities for differently oriented plane-polarized incident light. The multilayer stack can thus be made useful as a mirror. Multilayer optical films constructed accordingly exhibit a Brewster angle (the angle at which reflectance goes to zero for light incident at any of the layer interfaces) which is very large or is nonexistent. As a result, these polymeric multilayer stacks having high reflectivity for both s and p polarized light over a wide bandwidth, and over a wide range of angles, reflection can be achieved.

The multilayer polymeric mirror film can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials. The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers. In many embodiments, the multilayer polymeric mirror film includes low/high index pairs of film layers, wherein each low/high index pair of layers has a combined optical thickness of ½ the center wavelength of the band it is designed to reflect.

For multilayer polymeric mirror films, the desired average transmission for light of each polarization and plane of incidence generally depends upon the intended use of the reflective mirror film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400-700 nm) is desirably less than 10% (reflectance greater than 90%), or less than 5% (reflectance greater than 95%), or less than 2% (reflectance greater than 98%), or less than 1% (reflectance greater than 99%). The average transmission at 60 degrees from the normal from 400-700 nm is desirably less than 20% (reflectance greater than 80%), or less than 10% (reflectance greater than 90%), or less than 5% (reflectance greater than 95%), or less than 2% (reflectance greater than 98%), or less than 1% (reflectance greater than 99%).

With the design considerations described in the above mentioned U.S. Pat. No. 5,882,774, one of ordinary skill will readily appreciate that a wide variety of materials can be used to form multilayer polymeric reflective mirror films when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite of the first material. Or, the second material may have no birefringence, or less birefringence than the first material. Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

In many embodiments, the multilayer polymeric reflective mirror film alternating layers include PET/Ecdel, PEN/Ecdel, PEN/sPS, PEN/THV, PEN/co-PET, and PET/sPS, where "co-PET" refers to a copolymer or blend based upon terephthalic acid, Ecdel is a thermoplastic polyester commercially available from Eastman Chemical Co., and THV is a fluoropolymer commercially available from 3M Company, St. Paul, Minn.

The number of layers in the film is selected to achieve the desired optical properties using the minimum number of layers for reasons of film thickness, flexibility and economy. The number of layers can be less than 10,000, or less than 5,000, or less than 2,000. The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratios in the range from 1:2 to 1:10 (or from 1:3 to 1:7) in the stretch direction and from 1:0.2 to 1:10 (or from 1:0.3 to 1:7) orthogonal to the stretch direction is preferred.

A backlight provides distribution of light from a light source over an area much larger than the light source, substantially over an entire emission or output surface area of the backlight. Light often enters the backlight along an edge surface and propagates between a back or reflective surface and the output surface from the edge surface toward an opposing end surface of the backlight by total internal reflection (TIR). In some embodiments, the backlight back surface includes structures, e.g., dots in a pattern. A light ray encountering one of these structures is redirected, i.e., either diffusely or specularly reflected, in such a manner that it is caused to exit the output surface. In other embodiments, backlight light is extracted by frustration of the TIR. A ray confined within the backlight by TIR increases its angle of incidence relative to the plane of the output surface and reflective surface, due to the wedge angle, with each TIR bounce. The light eventually refracts out of the output surface at a glancing angle thereto, because it is no longer contained by TIR.

FIG. 1 provides an illustrative but non-limiting perspective schematic view of a backlight 10. The backlight 10 includes a visible light transmissive body 20 having a light guide portion 30 and a light input portion 40. The visible light transmissive body 20 can be formed of any useful light transmissive material such as, for example, glass, quartz, and/or a polymeric material. Useful polymeric material includes polyesters, polycarbonates, polyimides, polyacrylates, polymethylstyrenes, silicones such as GE's Invisisil liquid injection moldable material and the like. The visible light transmissive body 20 may be formed via any useful method. In some instances, the visible light transmissive body 20 is formed via injection molding. In other cases, the visible light transmissive body 20 is formed via machining and optionally polishing of a solid slab of material.

In many instances, the light transmissive body 20 is a solid body. In some embodiments, the light guide portion 30 and a light input portion 40 form a unitary or monolithic body. In other embodiments, the light guide portion 30 and a light input portion 40 are separate bodies having an interface surface 43, where the light guide portion 30 and a light input portion 40 are optically coupled together. The light input portion 40 and the light guide portion 30 whether separate or combined pieces can be fabricated by injection molding, casting, extrusion or by machining solid materials or any other suitable process. The optical coupling material is of an appropriate index to index match the light input portion 40 to the light guide portion 30.

The light guide portion 30 includes a light reflection surface 32 and a light emission surface 34. In some instances, as illustrated, the light reflection surface 32 and the light emission surface 34 may be substantially parallel. In other cases, the light reflection surface 32 and the light emission surface 34 may be substantially non-parallel. One or more optical elements (not shown) may be disposed adjacent to the light emission surface 34. The light input portion 40 diverges from a narrow end 42. The light input portion 40 includes opposing side surfaces 44, 46 that are not parallel and extend between the narrow end 42 and the light guide portion 30. If the light input portion 40 is separately formed, it will have a wide end 48 corresponding to the location of interface surface 43.

In many instances, the width ratio of the narrow end 42 to the wide end 48 (regardless of whether the interface surface 43 is presence or absent) is around 1:2, or as low as 1:1.4 for n=1.5 index materials. In some cases, the narrow end has a width in a range from 1 to 20 mm. The length of the diverging wedge or light input portion 40 can assist in mixing light emitted from two or more light sources emitting light into the narrow end 42 of the light input portion 40. In some instances, this length can be in a range from 1 to 200 mm.

While not expressly shown in this Figure, the light input portion 40 may include one or more light sources that may be disposed on and/or within one of the opposing side surfaces 44, 46 and near the narrow end 42. The light sources are shown in subsequent Figures. The light input portion 40 may be at least partially covered with a multilayer polymeric mirror film that reflects at least about 95 percent of light incident (at all angles) on the film. In some instances, the multilayer polymeric mirror film may reflect at least about 98 percent of all incident light, regardless of incident angle. The mirror film is shown in subsequent Figures. In many cases, the multilayer polymeric mirror film is Vikuiti™ ESR film, which is available from 3M Company, St. Paul, Minn.

As noted above, FIG. 1 is a schematic view of an illustrative but non-limiting backlight 10 that includes the light guide portion 30 and the light input portion 40. As discussed, the light input portion 40 may be integrally or monolithically formed with the light guide portion 30 utilizing injection molding or any suitable process. In some instances, the light input portion 40 may be separately formed and then subsequently optically coupled to the light input portion 30 using any suitable adhesive or other material. The light input portions described herein can have a symmetric shape or an asymmetric shape, as desired.

Figure 2:
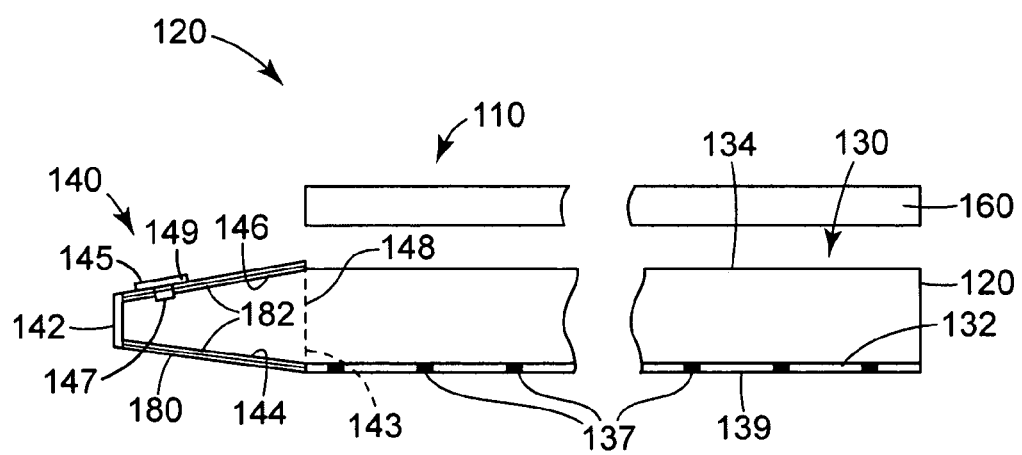
FIG. 2 is a partial section taken along line 2-2 of FIG. 1.

FIG. 2 is a schematic cross-sectional view of a backlight 110. The backlight 110 includes a visible light transmissive body 120 that has a light guide portion 130 and a light input portion 140. The visible light transmissive body 120 may be formed of any useful light transmissive material as described above. In some instances, the light guide portion 130 and the light input portion 140 form a unitary or monolithic body. In other cases, the light guide portion 130 and the light input portion 140 are separate bodies having an interface surface 143, where the light guide portion 130 and the light input portion 140 are optically coupled together.

The light guide portion 130 includes a light reflection surface 132 and a light output or emission surface 134. In the illustrated embodiment, the light reflection surface 132 and the emission surface 134 are substantially parallel. In many embodiments, the light reflection surface 132 includes a specular or diffuse reflective layer 139 and a plurality of light extraction elements 137. The light extraction elements 137 can be arranged in any useful random or non-random or pseudo-random pattern, as desired, to provide uniform extraction of light from the backlight. In some embodiments, the plurality of light extraction elements 127 are a pattern of dots from 0.1 to 10 mm in diameter.

One or more optical elements 160 can be disposed adjacent to the emission surface 134. In some embodiments, the optical element 160 includes a liquid crystal display. In other embodiments, the optical element 160 includes a liquid crystal display and one or more optical films disposed between the liquid crystal display and the emission surface 134. In a further embodiment, the optical element 140 may be a graphic film or other optical film. In a further embodiment, the optical element 160 may not be needed if, for example, the emission surface 134 is used as a light source or a luminaire.

The light input portion 140 diverges from a narrow end 142. In many embodiments, the light input portion 140 is a diverging wedge. The light input portion 140 includes opposing side surfaces 144, 146 that are not parallel and extend between the narrow end 142 and the light guide portion 130. In some embodiments, the light input portion 140 includes opposing side surfaces 144, 146 that are not parallel and extend between the narrow end 142 and a wide end 148 adjacent to the interface surface 143. In many embodiments, the width ratio of the narrow end 142 to the wide end 148 (regardless of whether the interface surface 143 is presence or absent) is around 1:2 or as low as 1:1.4 for n=1.5 index materials. Illustrative dimensions of the light input portion 140 are described above.

A light source 145 may be disposed adjacent to or within side surface 144 and/or side surface 146. As illustrated, a light source 145 is disposed along side surface 146, but this is not required. The light source 145 may include one or more LEDs 147 mounted onto a substrate 149. The substrate 149 may include a heat sink and/or circuitry adapted to power the one or more LEDs 147. In some instances, the light sources may be one or more light emitting diodes. In some cases, a linear array of LEDS, emitting at least red, blue and green light, may be used.

A multilayer polymeric mirror film 180 is disposed adjacent to the opposing side surfaces 144, 146 but is not in intimate contact with the opposing side surfaces 144, 146. An air gap 182 may be defined between the multilayer polymeric mirror film 180 and the opposing side surfaces 144, 146. In some instances, the light source 145 may extend through the multilayer polymeric mirror film 180.

The multilayer polymeric mirror film 180 is described above and reflects more than 95% of visible light (emitted light) incident on the multilayer polymeric mirror film 180. In some embodiments, the multilayer polymeric mirror film 180 reflects more than 98% of visible light (emitted light) incident at all angles on the multilayer polymeric mirror film 180. Multilayer polymeric mirror film 180 or any other useful reflective layer can be disposed along the narrow end 142 to assist in reflecting light emitted by the light source toward the light guide portion 130. In many embodiments, the multilayer polymeric mirror film is Vikuiti™ ESR film, which is available from 3M Company, St. Paul, Minn.

Figure 3:
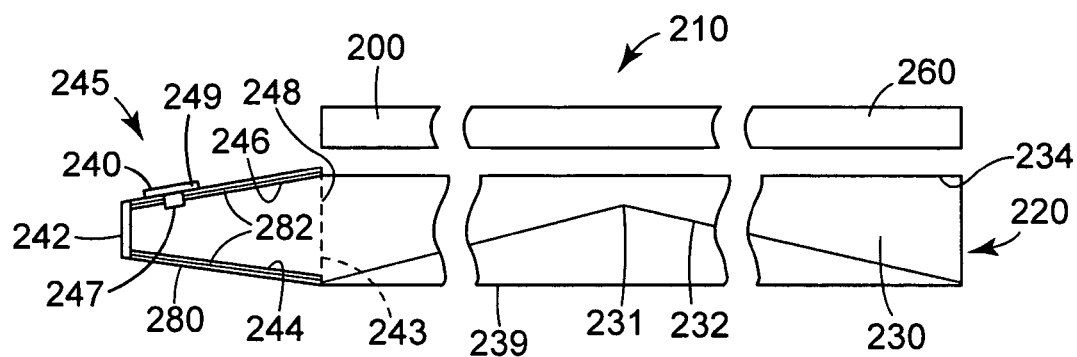
FIG. 3 is schematic perspective view of an illustrative but non-limiting backlight as described herein.

FIG. 3 is a schematic cross-sectional view of a backlight 210. The backlight 210 includes a visible light transmissive body 220 that has a light guide portion 230 and a light input portion 240. The visible light transmissive body 220 may be formed of any useful light transmissive material as described above. In some instances, the light guide portion 230 and the light input portion 240 form a unitary or monolithic body. In other cases, the light guide portion 230 and the light input portion 240 are separate bodies having an interface surface 243, where the light guide portion 230 and the light input portion 240 are optically coupled together.

The light guide portion 230 includes a light reflection surface 232 and a light output or emission surface 234. In the illustrated embodiment, the light reflection surface 232 and the emission surface 234 are substantially non-parallel, as the light reflection surface 232 includes an inflection point 231. In many embodiments, a specular or diffuse reflective layer 239 is disposed beneath the light reflection surface 232.

One or more optical elements 260 can be disposed adjacent to the emission surface 234. In some embodiments, the optical element 260 includes a liquid crystal display. In other embodiments, the optical element 260 includes a liquid crystal display and one or more optical films disposed between the liquid crystal display and the emission surface 234. In a further embodiment, the optical element 260 may be a graphic film or other optical film. In a further embodiment, the optical element 260 may not be needed if, for example, the emission surface 234 is used as a light source or a luminaire.

The light input portion 240 diverges from a narrow end 242. In many embodiments, the light input portion 240 is a diverging wedge. The light input portion 240 includes opposing side surfaces 244, 246 that are not parallel and extend between the narrow end 242 and the light guide portion 230. In some embodiments, the light input portion 240 includes opposing side surfaces 244, 246 that are not parallel and extend between the narrow end 242 and a wide end 248 adjacent to the interface surface 243. In many embodiments, the width ratio of the narrow end 242 to the wide end 248 (regardless of whether the interface surface 243 is presence or absent) is around 1:2 or as low as 1:1.4 for n=1.5 index materials. Illustrative dimensions of the light input portion 240 are described above.

A light source 245 may be disposed adjacent to or within side surface 244 and/or side surface 246. As illustrated, a light source 245 is disposed along side surface 246, but this is not required. The light source 245 may include one or more LEDs 247 mounted onto a substrate 249. The substrate 249 may include a heat sink and/or circuitry adapted to power the one or more LEDs 247. In some instances, the light sources may be one or more light emitting diodes. In some cases, a linear array of LEDS, emitting at least red, blue and green light, may be used.

A multilayer polymeric mirror film 280 is disposed adjacent to the opposing side surfaces 244, 246 but is not in intimate contact with the opposing side surfaces 244, 246. An air gap 282 may be defined between the multilayer polymeric mirror film 280 and the opposing side surfaces 244, 246. The multilayer polymeric mirror film 280 is described above and reflects more than 95% of visible light (emitted light) incident on the multilayer polymeric mirror film 280. In some embodiments, the multilayer polymeric mirror film 280 reflects more than 98% of visible light (emitted light) incident at all angles on the multilayer polymeric mirror film 280. Multilayer polymeric mirror film 280 or any other useful reflective layer can be disposed along the narrow end 242 to assist in reflecting light emitted by the light source toward the light guide portion 230. In many embodiments, the multilayer polymeric mirror film is Vikuiti™ ESR film, which is available from 3M Company, St. Paul, Minn.

Figure 4:
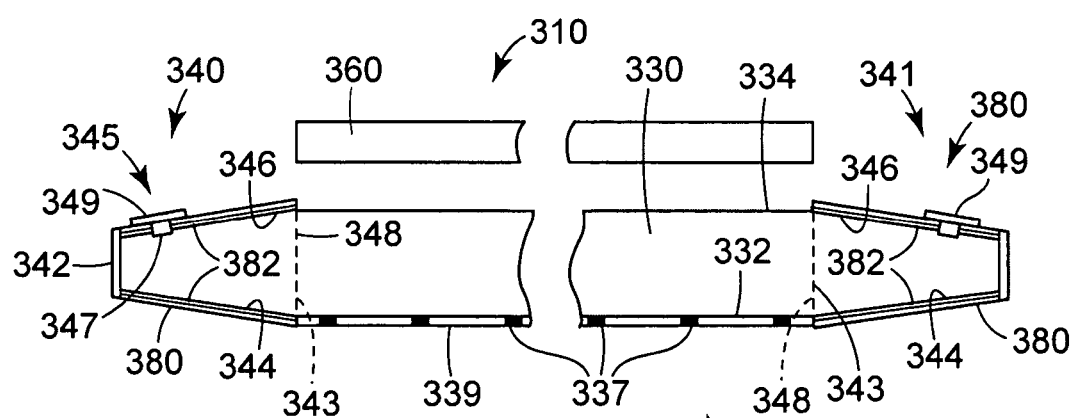
FIG. 4 is a schematic perspective view of an illustrative but non-limiting backlight as described herein.

FIG. 4 is a schematic cross-sectional view of a backlight 310. The backlight 310 includes a visible light transmissive body 320 that has a light guide portion 330, a first light input portion 340 and a second light input portion 341. The first light input portion 340 and the second light input portion 341 may be the same or different. For illustration purposes, the first and second light input portions 340, 341 are described similarly, but this is not required.

The visible light transmissive body 320 may be formed of any useful light transmissive material as described above. In some instances, the light guide portion 330 and the light input portions 340, 341 form a unitary or monolithic body. In other cases, the light guide portion 330 and the light input portions 340, 341 are separate bodies having interfaces surface 343, where the light guide portion 330 is optically coupled to the light input portions 340, 341.

The light guide portion 330 includes a light reflection surface 332 and a light output or emission surface 334. In the illustrated embodiment, the light reflection surface 332 and the emission surface 334 are substantially parallel. In many embodiments, the light reflection surface 332 includes a specular or diffuse reflective layer 339 and a plurality of light extraction elements 337. The light extraction element 337 can be arranged in any useful random or non-random or pseudo-random pattern, as desired, to provide uniform extraction of light from the backlight. In some embodiments, the plurality of light extraction elements 337 form a pattern of dots from 0.1 to 10 mm in diameter.

One or more optical elements 360 can be disposed adjacent to the emission surface 334. In some embodiments, the optical element 360 includes a liquid crystal display. In other embodiments, the optical element 360 includes a liquid crystal display and one or more optical films disposed between the liquid crystal display and the emission surface 334. In a further embodiment the optical element 360 may be a graphic film or other optical film. In a further embodiment, the optical element 660 may not be needed if, for example, the emission surface 634 is used as a light source or a luminaire.

As illustrated, each of the light input portions 340, 341 diverge from a narrow end 342. In many embodiments, they are diverging wedges. Each light input portion 340, 341 include opposing side surfaces 344, 346 that are not parallel and extend between the narrow end 342 and the light guide portion 330. In some embodiments, each light input portion 340, 341 include opposing side surfaces 344, 346 that are not parallel and extend between the narrow end 342 and a wide end 348 adjacent to the interface surface 343. In many embodiments, the width ratio of the narrow end 342 to the wide end 348 (regardless of whether the interface surface 343 is presence or absent) is around 1:2 or as low as 1:1.4 for n=1.5 index materials. Illustrative dimensions of each light input portion 340, 341 are described above.

A light source 345 may be disposed adjacent to or within side surface 344 and/or side surface 346. As illustrated, a light source 345 is disposed along side surface 346, but this is not required. The light source 345 may include one or more LEDs 347 mounted onto a substrate 349. The substrate 349 may include a heat sink and/or circuitry adapted to power the one or more LEDs 347. In some instances, the light sources may be one or more light emitting diodes. In some cases, a linear array of LEDS, emitting at least red, blue and green light, may be used.

A multilayer polymeric mirror film 380 is disposed adjacent to the opposing side surfaces 344, 346 but is not in intimate contact with the opposing side surfaces 344, 346. An air gap 382 may be defined between the multilayer polymeric mirror film 380 and the opposing side surfaces 344, 346. The multilayer polymeric mirror film 380 is described above and reflects more than 95% of visible light (emitted light) incident on the multilayer polymeric mirror film 380. In some embodiments, the multilayer polymeric mirror film 380 reflects more than 98% of visible light (emitted light) incident at all angles on the multilayer polymeric mirror film 380. Multilayer polymeric mirror film 380 or any other useful reflective layer can be disposed along the narrow end 342 to assist in reflecting light emitted by the light source toward the light guide portion 330. In many embodiments, the multilayer polymeric mirror film is Vikuiti™ ESR film, which is available from 3M Company, St. Paul, Minn.

Figure 5:
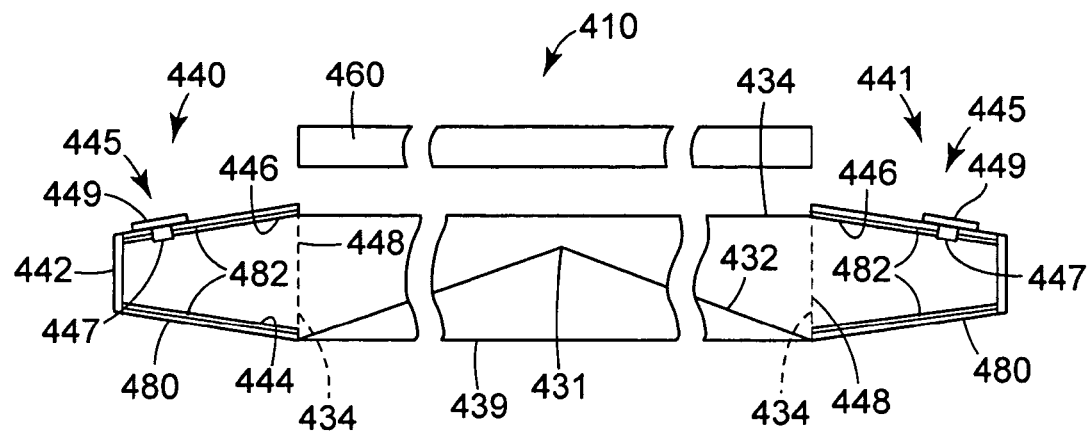
FIG. 5 is a schematic perspective view of an illustrative but non-limiting backlight as described herein.

FIG. 5 is a schematic cross-sectional view of a backlight 410. The backlight 410 includes a visible light transmissive body 420 that has a light guide portion 430, a first light input portion 440 and a second light input portion 441. The first light input portion 440 and the second light input portion 441 may be the same or different. For illustration purposes, the first and second light input portions 440, 441 are described similarly, but this is not required.

The visible light transmissive body 420 may be formed of any useful light transmissive material as described above. In some instances, the light guide portion 430 and each light input portion 440, 441 form a unitary or monolithic body. In other cases, the light guide portion 430 and the light input portions 440, 441 are separate bodies having an interface surface 443, where the light guide portion 430 and each light input portion 440, 441 are optically coupled together.

The light guide portion 430 includes a light reflection surface 432 and a light output or emission surface 434. In the illustrated embodiment, the light reflection surface 432 and the emission surface 434 are substantially non-parallel, as the light reflection surface 432 includes an inflection point 431. In many embodiments, a specular or diffuse reflective layer 439 is disposed beneath the light reflection surface 432.

One or more optical elements 460 can be disposed adjacent to the emission surface 434. In some embodiments, the optical element 460 includes a liquid crystal display. In other embodiments, the optical element 460 includes a liquid crystal display and one or more optical films disposed between the liquid crystal display and the emission surface 434. In a further embodiment the optical element 460 may be a graphic film or other optical film. In a further embodiment, the optical element 460 may not be needed if, for example, the emission surface 434 is used as a light source or a luminaire.

Each light input portion 440, 441 diverges from a narrow end 442. Each light input portion 440, 441 include opposing side surfaces 444, 446 that are not parallel and extend between the narrow end 442 and the light guide portion 430. In some embodiments, each light input portion 440, 441 include opposing side surfaces 444, 446 that are not parallel and extend between the narrow end 442 and a wide end 448 adjacent to the interface surface 443. In many embodiments, the width ratio of the narrow end 442 to the wide end 448 (regardless of whether the interface surface 443 is presence or absent) is around 1:2 or as low as 1:1.4 for n=1.5 index materials. Illustrative dimensions of the light input portion 440 are described above.

A light source 445 may be disposed adjacent to or within side surface 444 and/or side surface 446. As illustrated, a light source 445 is disposed along side surface 446, but this is not required. The light source 445 may include one or more LEDs 447 mounted onto a substrate 449. The substrate 449 may include a heat sink and/or circuitry adapted to power the one or more LEDs 447. In some instances, the light sources may be one or more light emitting diodes. In some cases, a linear array of LEDS, emitting at least red, blue and green light, may be used.

A multilayer polymeric mirror film 480 is disposed adjacent to the opposing side surfaces 444, 446 but is not in intimate contact with the opposing side surfaces 444, 446. An air gap 482 may be defined between the multilayer polymeric mirror film 480 and the opposing side surfaces 444, 446. The multilayer polymeric mirror film 480 is described above and reflects more than 95% of visible light (emitted light) incident on the multilayer polymeric mirror film 480. In some embodiments, the multilayer polymeric mirror film 480 reflects more than 98% of visible light (emitted light) incident at all angles on the multilayer polymeric mirror film 480. Multilayer polymeric mirror film 480 or any other useful reflective layer can be disposed along the narrow end 442 to assist in reflecting light emitted by the light source 445 toward the light guide portion 430. In many embodiments, the multilayer polymeric mirror film is Vikuiti™ ESR film, which is available from 3M Company, St. Paul, Minn.

Figure 6:
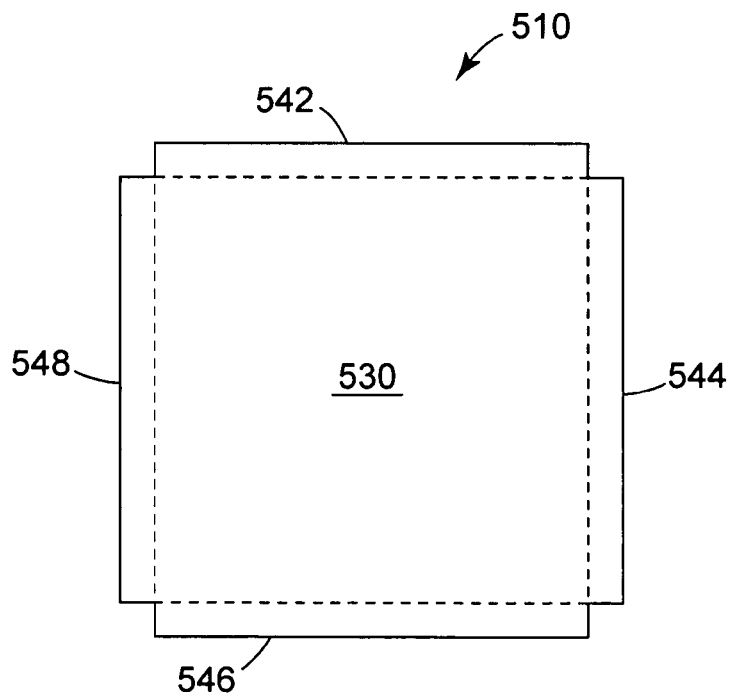
FIG. 6 is a schematic perspective view of an illustrative but non-limiting backlight as described herein.

In the illustrations discussed thus far, the backlights described herein included either one or two light input portions. In some cases, it is contemplated that three or even four light input portions could be employed. FIG. 6 is a schematic top view of a backlight 510 that includes a light guide portion 530. The top of the backlight 510, as seen, is the light emission surface. The backlight 510 also includes a first light input portion 542, a second light input portion 544, a third light input portion 546 and a fourth light input portion 548. Each light input portion 542, 544, 546 and 548 may be integrally molded or otherwise formed with the light guide portion 530. In other instances, one or more of the light input portions 542, 544, 546 and 548 may be formed separately and then subsequently attached to the light guide portion 530.

Each of the light input portions 542, 544, 546 and 548 may include one or more side-mounted encapsulated light sources, including light sources 160, 260 and 360 as previously discussed. Each light input portion 542, 544, 546 and 548 may include a single light source or a plurality of light sources.

The illustrated backlight 510 is shown generally having a square shape, however the backlight can have any polygonal shape and including one or more light input portions (including the light sources) adjacent to one or more of the polygonal sides. In some embodiments, the backlight 510 has a rectangular shape with either a 4 to 3 aspect ratio or a 16 to 9 aspect ratio, and are often useful in television or monitor application. In some instances, the backlight 510 is used in conjunction with a commercial graphics display, or a sign.

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

We claim:

1. A backlight comprising:
a visible light transmissive body primarily propagating light by TIR with an input and output surface, the visible light transmissive body having a light guide portion and a light input portion, the light guide portion having a light reflection surface and a light emission surface, the light input portion having opposing side surfaces that are not parallel;
a plurality of light emitting diode light sources disposed within the input surface, the light sources emitting light into the light input portion, the input surface being one of the opposing side surfaces;
a multilayer polymeric mirror film disposed along the opposing side surfaces but not in intimate contact with the opposing side surfaces and reflecting more than 95% of visible light incident on the multilayer polymeric mirror film.

2. A backlight according to claim 1 wherein the light emission surface and the light reflection surface are parallel, and the light reflection surface comprises a plurality of light extraction elements.

3. A backlight according to claim 1 wherein the light emission surface and the light reflection surface are non-parallel.

4. A backlight according to claim 1 wherein the light emitting diode light sources comprise a plurality of light sources emitting red, blue and green light.

5. A backlight according to claim 4 wherein the light emitting diode light sources further comprise a plurality of light sources emitting cyan, yellow or magenta light.

6. A backlight according to claim 1 wherein the multilayer polymeric mirror film reflects more than 98% of visible light incident at any angle on the multilayer polymeric mirror film.

7. A backlight according to claim 1 further comprising a liquid crystal display panel disposed adjacent to the light emission surface.

8. A backlight according to claim 1 wherein the light emitting diode light sources are optically coupled to the light input portion.

9. A backlight according to claim 1, wherein the light emitting diode light sources extend through the multilayer polymeric mirror film.

10. A backlight comprising:
a diverging wedge defined by a narrow end surface and a wide end surface, and opposing side surfaces that are not parallel and extend between the narrow end and the wide end;
a light emitting diode light source disposed within one of the opposing side surfaces and between the narrow end and the wide end, the light emitting diode light source emitting light into the diverging wedge;
a light guide optically coupled to the wide end surface, the light guide having a light reflection surface and a light emission surface; and
a multilayer polymeric mirror film disposed along the opposing side surfaces but not in intimate contact with the opposing side surfaces, the multilayer polymeric mirror film reflecting more than 95% of visible light incident on the multilayer polymeric mirror film, wherein the light emitting diode extends through the multilayer polymeric mirror film.

11. A backlight according to claim 10 wherein the light emission surface and the light reflection surface are parallel, and the light reflection surface comprises a plurality of light extraction elements.

12. A backlight according to claim 10 wherein the light emission surface and the light reflection surface are non-parallel.

13. A backlight comprising:
a first diverging wedge defined by a first narrow end surface and a first wide end surface, and first opposing side surfaces that are not parallel and extend between the first narrow end and the first wide end;
a first light source disposed along one of the first opposing side surfaces and between the first narrow end and the first wide end, the first light source emitting light into the first diverging wedge;
a second diverging wedge defined by a second narrow end surface and a second wide end surface, and second opposing side surfaces that are not parallel and extend between the second narrow end and the second wide end;
a second light source disposed along the one of the second opposing side surfaces and between the second narrow end and the second wide end, the second light source emitting light into the second diverging wedge;
a light guide optically coupled to the first wide end surface and the second wide end surface, the light guide having a light reflection surface and a light emission surface, the first wide end surface coupled to a first side surface of the light guide and the second wide end surface coupled to a second side surface of the light guide, the first side surface opposing the second side surface; and
a multilayer polymeric mirror film disposed along the first and second opposing side surfaces but not in intimate contact with the first and second opposing side surfaces, the multilayer polymeric mirror film reflecting more than 95% of light incident on the multilayer polymeric mirror film.

14. A backlight according to claim 13 wherein the first light source comprises a plurality of light emitting diodes and the second light source comprises a plurality of light emitting diodes.

15. A backlight according to claim 13 wherein the first light source comprises a plurality of light sources emitting red, blue and green light and the second light source comprises a plurality of light sources emitting red, blue and green light.

16. A backlight according to claim 13 wherein the multilayer polymeric mirror film reflects more than 98% of visible light incident at all angles on the multilayer polymeric mirror film.

17. A backlight according to claim 13 wherein the light emission surface and the light reflection surface are parallel, and the light reflection surface comprises a plurality of light extraction elements.

18. A backlight according to claim 13 further comprising a third diverging wedge defined by a third narrow end surface and a third wide end surface, and third opposing side surfaces that are not parallel and extend between the third narrow end and the third wide end; a third light source disposed along one of the third opposing side surfaces, the third light source emitting light into the third diverging wedge; the light guide optically coupled to the third wide end surface; and multilayer polymeric mirror film disposed along the third opposing side surfaces but not in intimate contact with the third opposing side surfaces, the multilayer polymeric mirror film reflecting more than 95% of light incident on the multilayer polymeric mirror film.

19. A backlight according to claim 13 further comprising a liquid crystal display panel disposed adjacent to the light emission surface.

* * * * *